Oct. 10, 1933.　　　E. A. WEEKS　　　1,929,799
COMBINED SCARIFIER AND SCRAPER FOR TRUCKS
Filed June 20, 1931　　　5 Sheets-Sheet 1

INVENTOR
Ernest A. Weeks
BY
ATTORNEYS

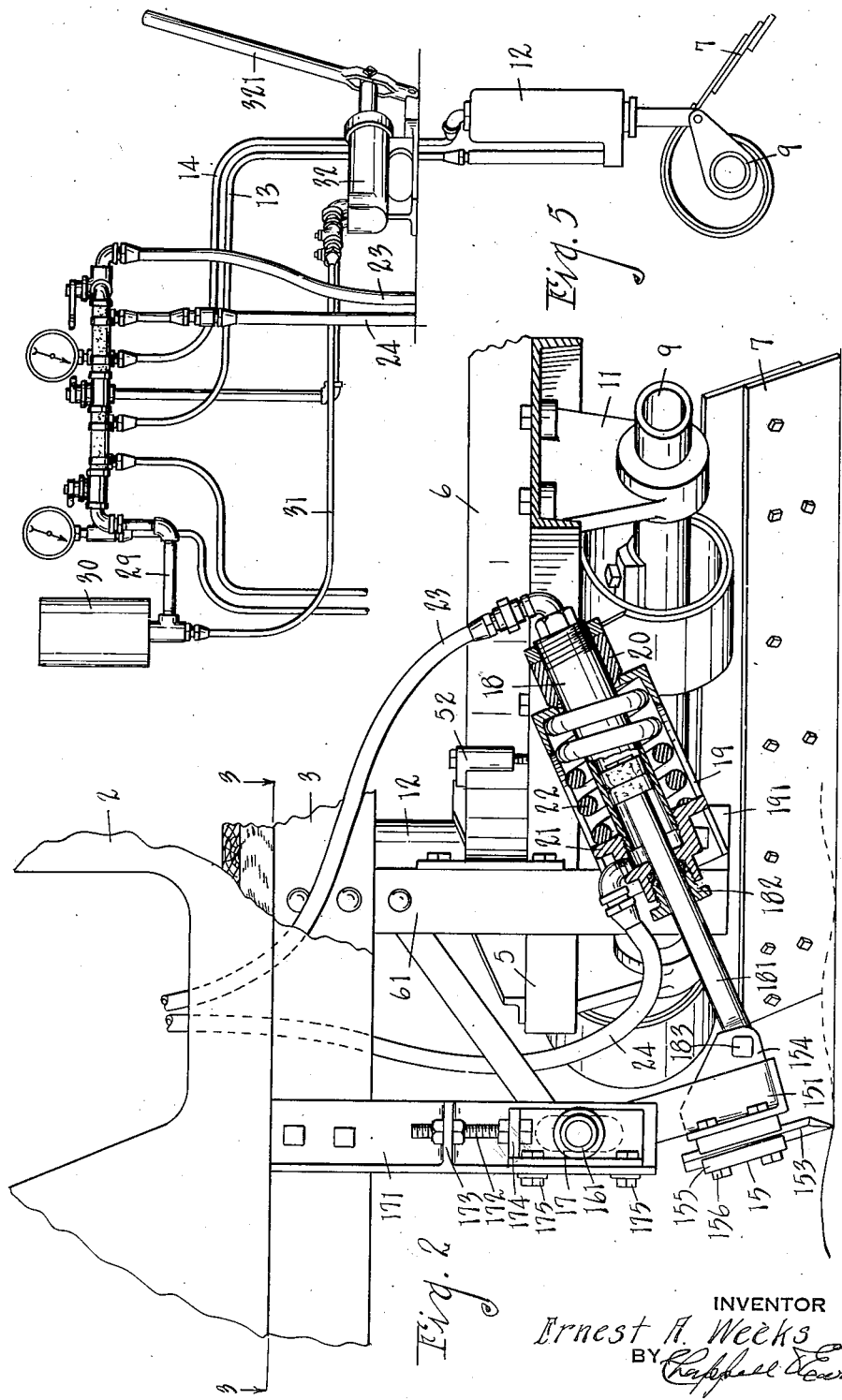

Oct. 10, 1933.                E. A. WEEKS                1,929,799
              COMBINED SCARIFIER AND SCRAPER FOR TRUCKS
                        Filed June 20, 1931          5 Sheets-Sheet 3
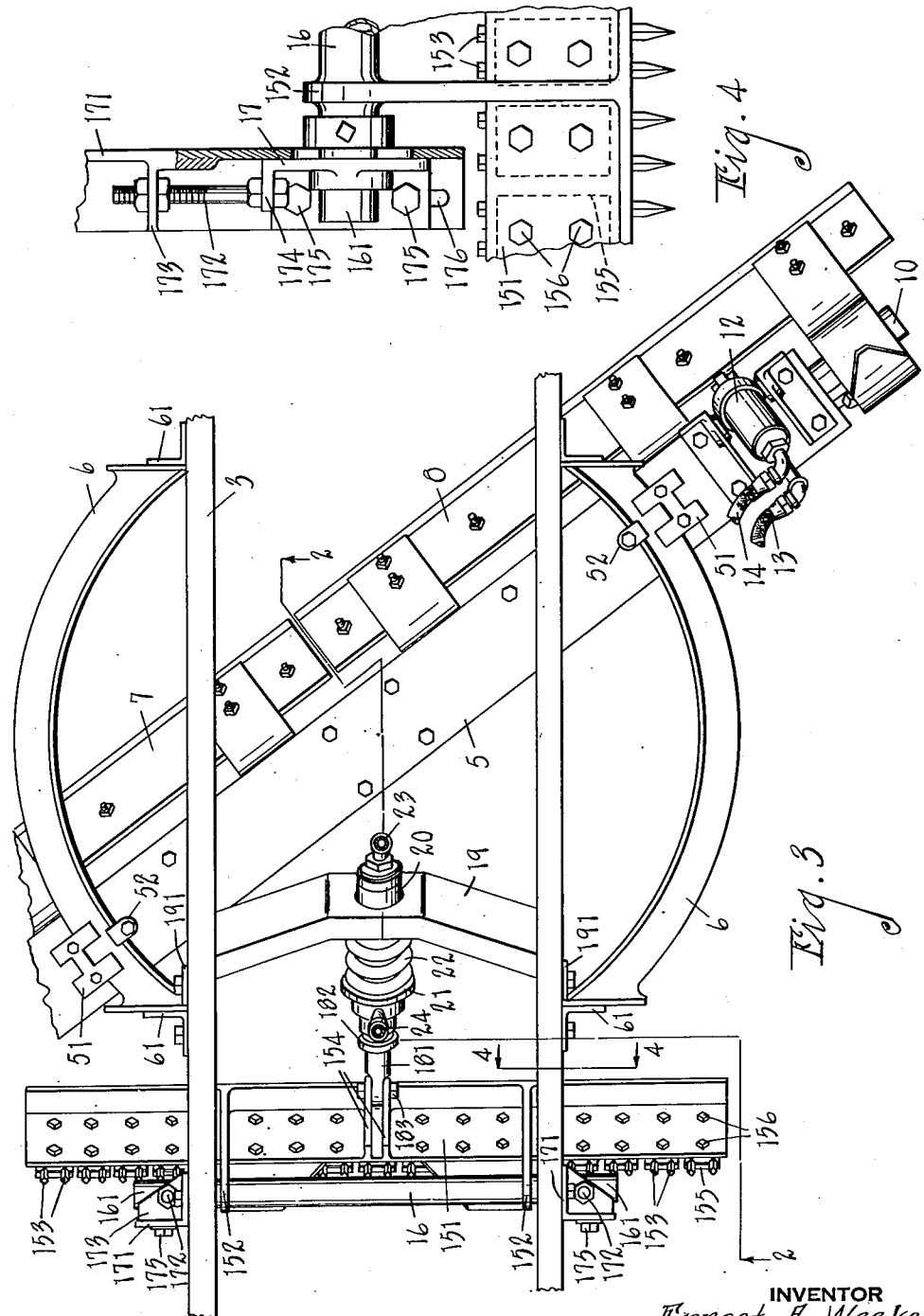
INVENTOR
*Ernest A. Weeks*
BY
ATTORNEYS Oct. 10, 1933.    E. A. WEEKS    1,929,799
COMBINED SCARIFIER AND SCRAPER FOR TRUCKS
Filed June 20, 1931    5 Sheets-Sheet 4
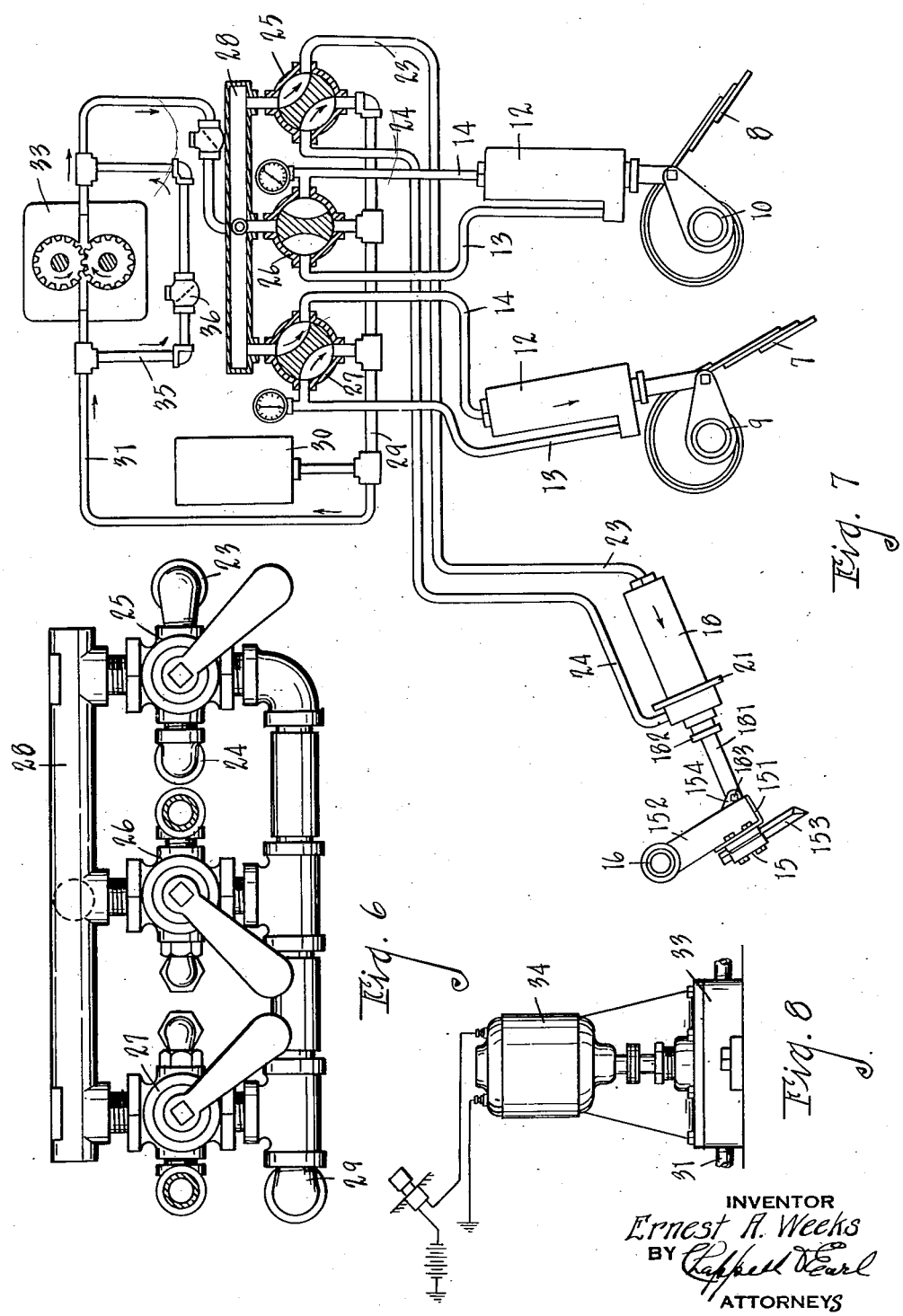
INVENTOR
Ernest A. Weeks
BY
ATTORNEYS

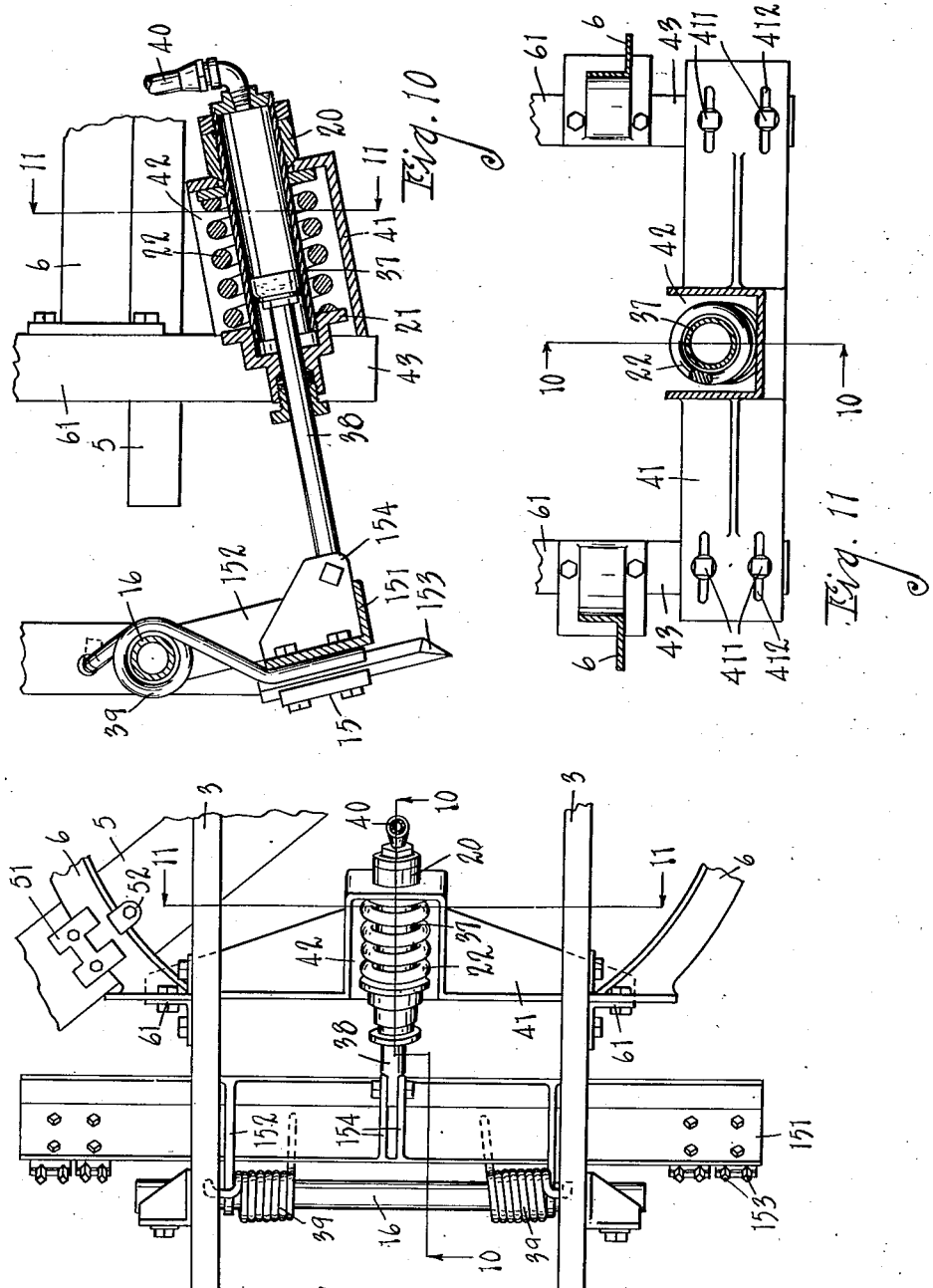

Patented Oct. 10, 1933

1,929,799

UNITED STATES PATENT OFFICE 1,929,799

COMBINED SCARIFIER AND SCRAPER FOR TRUCKS

Ernest A. Weeks, Kalamazoo, Mich., assignor to Root Spring Scraper Company, Kalamazoo, Mich.

Application June 20, 1931. Serial No. 545,664

11 Claims. (Cl. 37—145)

This invention relates to improvements in combined scarifiers and scrapers for trucks for highway use.

The objects of the invention are:

First, to provide an improved combination scarifier and scraper for use with motor trucks especially adapted for conditioning gravel roads.

Second, to provide such a combined structure especially adapted and connected for hydraulic operation.

Third, to provide such a scarifier which is adapted to break and cut the surface, such as chatter bumps, to effect the leveling and conditioning of the road by the scraper.

Fourth, to provide an improved hydraulic scarifier for use in a road machine.

Fifth, to provide improved hydraulic connections and controls for a scarifier and scraper means.

Objects pertaining to details and economies of my invention will definitely appear from the description to follow. The invention is defined in the claims.

A structure which embodies the features of my invention is clearly illustrated in the accompanying drawings in a variety of forms, in which:

Fig. 2 is an enlarged detail side elevation partially in section on line 2—2 of Fig. 3, showing details of a double-acting power cylinder for the scarifier.

Fig. 3 is an enlarged detail plan view taken on line 3—3 of Figs. 1 and 2 showing the frame sides, the scraper at one side being in part broken away and the power cylinder with connections being indicated on one of the scrapers.

Fig. 4 is an enlarged detail sectional view on line 4—4 of Fig. 3 showing details of the scarifier and scarifier trunnion and adjusting means.

Fig. 5 is a diagrammatic view of the hydraulic connections, pump and controls for the hand pump structure illustrated in Fig. 1.

Fig. 6 is an enlarged detail elevation of the series of four-way control cocks or valves for controlling the scraper and scarifier cylinders.

Fig. 7 is a diagrammatic view of the four-way cocks, electric power pump, and the various hydraulic connections for operating both scrapers and scarifier by electric power.

Fig. 8 is an enlarged detail elevation of the electric rotary power pump indicated in Fig. 7.

Fig. 9 is a detail plan of a modification of a single acting cylinder scarifier control means, it being a view similar to the forward part of Fig. 3.

Fig. 10 is a detail sectional view on the irregular line 10—10 of Figs. 9 and 11 showing details of construction of such single-acting hydraulic cylinder structure.

Fig. 11 is a detail transverse sectional view on line 11—11 of Figs. 9 and 10.

Figure 1:
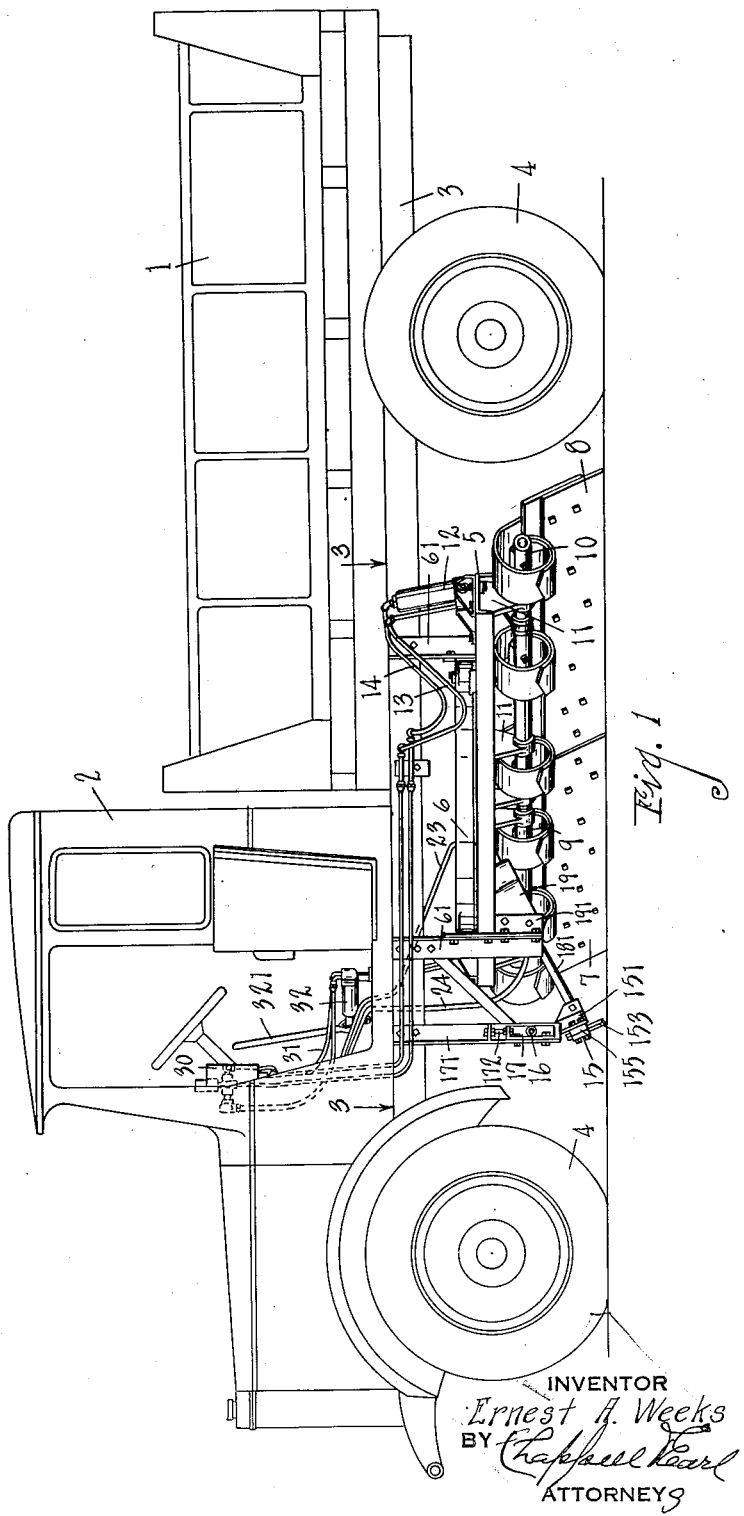
Fig. 1 is a diagrammatic side elevation of a motor truck with my improved combined scarifier and scraper in place, the hose connection to the power cylinders and a hand pump in the cab being incorporated.

The parts will be identified by their numerals of reference which are the same in all the views.

1 is the truck body, 2 is the cab, 3 is the chassis frame, 4 are the wheels, 5 is the hanger board or beam which carries the scrapers, and 6, 6 are the segments on which the hanger board is adjusted by clamps 51, 52. A pair of scrapers 7, 8 are secured to rockshafts 9, 10, which are carried by suitable hanger brackets 11 secured to said hanger board. The segments 6, 6 are secured to the chassis frame 3 by hangers 61, 61 suitably bolted thereto. Each scraper is controlled by a double acting piston hydraulic cylinder 12 which is supplied through pipes 13, 14.

15 is the scarifier made up of a transverse beam 151 of structural steel of L-form to give it the necessary rigidity, as shown. To this are secured by arc welding a pair of arms 152, 152, as clearly appears in Fig. 3. A pair of brackets 154, 154 are also secured centrally of said beam, as seen in Fig. 3. The arms 152 are secured by welding to the rockshaft 16. Square scarifier teeth 153 cut at a bevel on their lower ends with one angle forward are secured by clips 155 and bolts 156 to the said beam 151.

The shaft 16 has journal extensions 161 journaled in adjustable bearing brackets 17 carried by hangers 171. The brackets are adjustable up and down by adjusting bolts 172 (Fig. 4), the bolts 172 extending through fixed brackets 173 on the hangers 171 and through lugs 174 on the brackets 17. Bolts 175 extending through slots 176 secure the brackets 17 adjustably in place, see Fig. 4.

The scarifier when it is swung into engagement with the road surface is inclined slightly to the rear as seen in Fig. 1 so that the sharp points of the scarifier teeth tend to slide over the surface and abrade the same with parallel cuts without digging sharply into the surface. This scarifier runs across the tops of the "chatter bumps" as indicated, at the road level line in Fig. 2, abrading the top of the same so that when the scraper follows the road will be effectively leveled. Teeth that incline downwardly and forwardly tend to dig the surface to such an extent as to break the same and disturb it below the scraper level, while the inclination to the rear slightly scarifies the surface so that the scraper cuts to the same level and leaves a firm surface.

The scarifier is controlled in one form of the structure by the double-acting cylinder structure 18. The piston 181 extends through the stuffing box 182 and is pivoted at 183 directly to the brackets 154 on the scarifier beam. The cylinder is supported in the bent cross beam 19 made of a channel bar with the channel side forward, the beam being secured to the forward hangers 61 by brackets 191. The collar 20 on the cylinder 18 rests against the central part of the beam 19, the collar being beveled so that it readily shifts its angle in relation thereto.

On the forward end of the cylinder is provided a flanged head 21 and a heavy coiled spring 22 is between the flanged head and the central part of the beam 19, holding the cylinder to place by yielding pressure. Owing to the loose fit of the cylinder in the beam 19 a shifting of the cylinder to accommodate the angle of connection to the scarifier is permitted, thus avoiding the necessity of any special trunnion and enabling a rigid piston rod to be used.

23 is the pipe supplying the rear end of the cylinder and 24 is the pipe supplying the front end of the cylinder, being connected to the flanged head 21. As seen in Fig. 2, oil or other medium is admitted to the rear of the cylinder through pipe 23 and through its connection exerts direct pressure on the scarifier beam, holding it to its work. Should a very hard obstruction, as a rock or pavement too hard to be scarified, be encountered, the scarifier swings on its rockshaft 16, forcing the whole cylinder backward and compressing the spring 22. This is an emergency device which prevents the breaking of the scarifier or the stopping of the truck.

25 is the four-way cock controlling the scarifier cylinder. 26 and 27 are the four-way cocks controlling the scraper cylinders. The four-way cocks are supplied from header 28 and discharge through connection 29 to supply tank 30. The supply tank 30 is connected by pipe 31 to the hand pump 32 which is operated by the hand lever 321 in the usual manner.

Where an electric power pump 33 driven by electric motor 34 is made use of, a by-pass 35 containing a check 36 extends around the pump 33. The object of this is to permit the flow of oil or other medium by gravity when the four-way cocks are turned to the position to apply the scrapers or scarifiers, and will permit the same to drop by gravity as the oil will pass the check valve, due to the action of the weighted parts in pulling the pistons down. The by-pass 35 and the check valve 36 may be dispensed with by operating the pump, but it is found to be highly desirable to permit these parts to drop down by their own gravity and then applying the pressure, it being economical of power to do this.

In Figs. 9, 10 and 11 I illustrate a form of scarifier control means in which a single acting cylinder 37 is made use of. This cylinder is provided with a single acting piston 38 which connects to the brackets 154 on the scarifier beam 15.

Coiled return springs 39 disposed on shaft 16 are provided for the scarifier which swings the same up out of contact as soon as the pressure on the single acting cylinder 37 is released. With this cylinder only a single supply line 40 is needed, and this scarifier is especially designed for use with scrapers like those illustrated in my patent application Serial No. 245,982, filed January 11, 1928, where the scrapers are returned to the elevated position by spring action and are forced down by the hydraulic cylinder.

The hydraulic cylinder 37 I show supported on a specially constructed cross beam 41, Fig. 11. A central recess 42 is formed to receive the cylinder 37 and its spring 22, the cross beam being held adjustably in place by bolts 411 in slots 412 at each end, the same being thereby secured to hangers 43 which depend from the chassis frame as seen in Figs. 10 and 11.

I have thus described and indicated the structure of the different parts and their action will be readily understood. I will first indicate the steps in making use of the double acting cylinder structure. The operator adjusts the four-way cocks to permit the scrapers and scarifier to drop down to the road surface. When they have dropped into contact with the ground, a few strokes of the pump handle 321 applies pressure. It is possible for these parts to drop by gravity owing to the usual valve arrangement of the piston pump 32.

Where the power pump is made use of, see Fig. 7, it is possible to permit the parts to drop by gravity due to the presence of the by-pass 35 containing the check valve 36. The geared power pump will not yield readily and it is necessary to provide the by-pass to permit the parts to drop to place by gravity. When they have dropped down into contact with the road surface, pressure is applied by operating the motor 34 for the brief interval required. The gauges will show the pressure in each instance.

It will be seen that it is possible to throw the scarifier up out of the way at any time by operating its four-way valve independently. With the double acting cylinder structure, when it is desired to raise the scarifier and scrapers, the four-way cocks are adjusted to that position and the pump operated and the pistons elevated. The valves are then closed and hold the parts in elevated position by controlling the supply of the medium, which is preferably oil.

Where the spring returned piston device is provided the four-way cocks simply permit the spring pressure to return the medium from the cylinder to the supply tank ready to be pumped when it is again desired to apply the pressure. The control is independent for the scarifier and each scraper because there is an independent four-way cock for the scarifier and each scraper.

My improved scarifier is usable with any scraper. It might be adjusted by any suitable means.

Having thus described my invention what I claim as new and desire to secure by Letters Patent is:

1. In a road machine structure, the combination of a truck chassis, a scraper structure comprising a supporting hanger beam, means for attaching the same to said chassis, hanger brackets on said beam, a pair of axially disposed rockshafts journaled in said brackets, a spring scraper carried by each rockshaft, a double acting hydraulic power cylinder piston structure for each scraper mounted on said beam and connected to actuate each of said scrapers to raise and lower the same, a pivotally supported scarifier comprising a beam provided with suitable downwardly and readwardly pointed teeth, hangers for supporting the same on said chassis frame, a cross beam suspended from said chassis frame to the rear of said scarifier, a double acting power cylinder supported by said beam and disposed centrally and transversely through said beam in a bore larger than said cylinder, a stop collar on said cylinder to engage said beam and permit adjustment of the same, a flanged head on the forward end of said cylinder, a compression spring disposed around said cylinder and between the said beam and the flanged head for holding the said cylinder yieldingly in position, a double acting piston with piston rod pivotally connected to said scarifier beam, hydraulic pipe connections to each of said double acting power cylinders, a header in the cab, a supply reservoir, a four-way valve for each cylinder for controlling the said pipe connections to the header, and a hand actuated power pump for delivering oil or other medium under pressure through said valves to the said cylinders whereby the said scrapers and scarifier may be allowed to drop to the road surface by gravity and be then forced and held to position by hydraulic pressure and the same be elevated by hydraulic pressure.

2. In a road machine structure, the combination of a truck chassis, a scraper structure comprising a supporting hanger beam, means for attaching the same to said chassis, hanger brackets on said beam, a pair of axially disposed rockshafts journaled in said brackets, a spring scraper carried by each rockshaft, a double acting hydraulic power cylinder piston structure for each scraper mounted on said beam and connected to actuate each of said scrapers to raise and lower the same, a pivotally supported scarifier comprising a beam provided with suitable downwardly and rearwardly pointed teeth, hangers for supporting the same on said chassis frame, a cross beam suspended from said chassis frame to the rear of said scarifier, a double acting power cylinder supported by said beam and disposed centrally and transversely through said beam in a bore larger than said cylinder, a stop collar on said cylinder to engage said beam and permit adjustment of the same, a flanged head on the forward end of said cylinder, a compression spring disposed around said cylinder and between the said beam and the flanged head for holding the said cylinder yieldingly in position, a double acting piston with piston rod pivotally connected to said scarifier beam, hydraulic pipe connections to each of said double acting power cylinders, a header in the cab, a supply reservoir, a four-way valve for each cylinder for controlling the said pipe connections to the header, and a hand actuated power pump for delivering oil or other medium under pressure through said valves to the said cylinders.

3. In a road machine structure, the combination of a truck chassis with cab, a scraper structure comprising a supporting hanger beam, means for attaching the same to said chassis, hanger brackets on said beam, a pair of axially disposed rockshafts journaled in said brackets, a spring scraper carried by each rockshaft, a double acting hydraulic power cylinder piston structure for each scraper mounted on said beam and connected to actuate each of said scrapers to raise and lower the same, a pivotally supported scarifier comprising a beam provided with suitable downwardly and rearwardly pointed teeth, hangers for supporting the same on said chassis frame, a cross beam suspended from said chassis frame to the rear of said scarifier, a double acting power cylinder supported by said beam and disposed centrally and transversely through said beam in a bore larger than said cylinder, a stop collar on said cylinder to engage said beam and permit adjustment of the same, a flanged head on the forward end of said cylinder, a compression spring disposed around said cylinder and between the said beam and the flanged head for holding the said cylinder yieldingly in position, a double acting piston with piston rod pivotally connected to said scarifier beam, hydraulic pipe connections to each of said double acting power cylinders, a header in the cab, a supply reservoir, a four-way valve for each cylinder for controlling the said pipe connections to the header, a rotary power driven pump for delivering oil or other medium under pressure through said valves to said cylinders, and a by-pass past said pump with a check valve therein whereby the said scrapers and scarifier may be allowed to drop to the road surface by gravity and then be forced and held to position by hydraulic pressure and be elevated by hydraulic pressure.

4. In a road machine structure, the combination of a truck chassis with cab, a scraper structure comprising a supporting hanger beam, means for attaching the same to said chassis, hanger brackets on said beam, a pair of axially disposed rockshafts journaled in said brackets, a spring scraper carried by each rockshaft, a double acting hydraulic power cylinder piston structure for each scraper mounted on said beam and connected to actuate each of said scrapers to raise and lower the same, a pivotally supported scarifier comprising a beam provided with suitable downwardly and rearwardly pointed teeth, hangers for supporting the same on said chassis frame, a cross beam suspended from said chassis frame to the rear of said scarifier, a double acting power cylinder supported by said beam and disposed centrally and transversely through said beam in a bore larger than said cylinder, a stop collar on said cylinder to engage said beam and permit adjustment of the same, a flanged head on the forward end of said cylinder, a compression spring disposed around said cylinder and between the said beam and the flanged head for holding the said cylinder yieldingly in position, a double acting piston with piston rod pivotally connected to said scarifier beam, hydraulic pipe connections to each of said double acting power cylinders, a header in the cab, a supply reservoir, a four-way valve for each cylinder for controlling the said pipe connections to the header, and a rotary power driven pump for delivering oil or other medium under pressure through said valves to said cylinders.

5. In a road machine structure, the combination of a truck chassis with cab, a scraper structure suspended from said chassis with means for controlling the same, a pivotally supported scarifier comprising a beam provided with suitable downwardly and rearwardly pointed teeth, hangers for supporting the same on said chassis frame, a cross beam suspended from said chassis frame to the rear of said scarifier, a double acting power cylinder supported by said beam and disposed centrally and transversely through said beam in a bore larger than said cylinder, a stop collar on said cylinder to engage said beam and permit adjustment of the same, a flanged head on the forward end of said cylinder, a compression spring disposed around said cylinder and between the said beam and the flanged head for holding the said cylinder yieldingly in position, a double acting piston with piston rod pivotally connected to said scarifier beam, hydraulic pipe connections to each of said double acting power cylinders, hydraulic power means, and means in said cab for controlling said hydraulic power means.

6. In a road machine structure, the combination of a truck chassis with cab, a scraper structure suspended from said chassis with means for controlling the same, a pivotally supported scarifier comprising a beam provided with suitable downwardly and rearwardly pointed teeth, hangers for supporting the same on said chassis frame, a cross beam suspended from said chassis frame to the rear of said scarifier, a double acting power cylinder supported by said beam and disposed centrally and transversely through said beam in a bore larger than said cylinder, a stop collar on said cylinder to engage said beam and permit adjustment of the same, a flanged head on the forward end of said cylinder, a compression spring disposed around said cylinder and between the said beam and the flanged head for holding the said cylinder yieldingly in position, a double acting piston with piston rod pivotally connected to said scarifier beam, hydraulic power means, and means in said cab for controlling said hydraulic power means.

7. In a road machine structure, the combination of a truck chassis with cab, a scraper structure suspended from said chassis with means for controlling the same, a pivotally supported scarifier comprising a beam provided with suitable downwardly and rearwardly pointed teeth, hangers for supporting the same on said chassis frame, a double acting power cylinder disposed and supported beneath the truck chassis, a spring for holding the same yieldingly in position to permit the scarifier to yield and pass obstructions, a double acting piston with piston rod pivotally connected to said scarifier beam, hydraulic power means, and means in said cab for controlling said hydraulic power means.

8. In a road machine structure, the combination of a truck chassis with cab, a scraper structure suspended from said chassis with means for controlling the same, a pivotally supported scarifier comprising a beam provided with suitable downwardly and rearwardly pointed teeth, hangers for supporting the same on said chassis frame, a double acting power cylinder disposed and supported beneath the truck chassis, a double acting piston with piston rod pivotally connected to said scarifier beam, hydraulic power means, and means in said cab for controlling said hydraulic power means.

9. In a road machine structure, the combination of a truck chassis with cab, a pivotally supported scarifier comprising a beam provided with suitable downwardly and rearwardly pointed teeth, hangers for supporting the same on said chassis frame, a cross beam suspended from said chassis frame to the rear of said scarifier, a double acting power cylinder supported by said beam and disposed centrally and transversely through said beam in a bore larger than said cylinder, a stop collar on said cylinder to engage said beam and permit adjustment of the same, a flanged head on the forward end of said cylinder, a compression spring disposed around said cylinder and between the said beam and the flanged head for holding the said cylinder yieldingly in position, a double acting piston with piston rod pivotally connected to said scarifier beam, hydraulic power means, and means in said cab for controlling said hydraulic power means.

10. In a road machine structure, the combination of a truck chassis with a cab, a pivotally supported scarifier comprising a beam provided with suitable downwardly and rearwardly pointed teeth, hangers for supporting the same on said chassis frame, a double acting power cylinder disposed and supported beneath the truck chassis, a spring for holding the same yieldingly in position to permit the scarifier to yield and pass obstructions, a double acting piston with piston rod pivotally connected to said scarifier beam, hydraulic power means, and means in said cab for controlling said hydraulic power means.

11. In a road machine structure, the combination of a truck chassis with cab, a pivotally supported scarifier comprising a beam provided with suitable downwardly and rearwardly pointed teeth, hangers for supporting the same on said chassis frame, a double acting power cylinder disposed and supported beneath the truck chassis, a double acting piston with piston rod pivotally connected to said scarifier beam, hydraulic power means, and means in said cab for controlling said hydraulic power means.

ERNEST A. WEEKS.